United States Patent
Viitanen

(10) Patent No.: US 12,074,431 B2
(45) Date of Patent: Aug. 27, 2024

(54) THREE-LEVEL BRAKE CHOPPER AND METHOD FOR CONTROLLING THREE-LEVEL BRAKE CHOPPER

(71) Applicant: ABB Schweiz AG, Baden (CH)

(72) Inventor: Tero Viitanen, Helsinki (FI)

(73) Assignee: ABB Schweiz AG, Baden (CH)

(*) Notice: Subject to any disclaimer, the term of this patent is extended or adjusted under 35 U.S.C. 154(b) by 177 days.

(21) Appl. No.: 17/821,521

(22) Filed: Aug. 23, 2022

(65) Prior Publication Data
US 2023/0054916 A1 Feb. 23, 2023

(30) Foreign Application Priority Data
Aug. 23, 2021 (EP) .................................... 21192499

(51) Int. Cl.
*H02M 1/32* (2007.01)
*H02H 7/122* (2006.01)
*H02M 7/537* (2006.01)

(52) U.S. Cl.
CPC .............. *H02H 7/122* (2013.01); *H02M 1/32* (2013.01); *H02M 7/537* (2013.01)

(58) Field of Classification Search
CPC .......... H02M 1/32; H02M 1/14; H02M 3/158; H02M 1/08; H02M 7/217; H02M 7/487; H02H 7/122; H02P 29/024; H02P 29/0241; H02P 29/027; H02P 29/04; H02P 29/02
USPC ...................................................... 361/86–87
See application file for complete search history.

(56) References Cited

U.S. PATENT DOCUMENTS

2018/0034362 A1* 2/2018 Kubouchi ............... H02M 1/32
2021/0050796 A1* 2/2021 Biris ....................... H02J 3/381

FOREIGN PATENT DOCUMENTS

CN 208508820 U 2/2019

OTHER PUBLICATIONS

European Search Report; Application No. EP 21 19 2499; Issued: Feb. 1, 2022; 3 Pages.

* cited by examiner

*Primary Examiner* — Danny Nguyen
(74) *Attorney, Agent, or Firm* — Whitmyer IP Group LLC

(57) ABSTRACT

A method for controlling a three-level brake chopper and a three-level brake chopper including, a first controllable semiconductor switch connected between a positive direct current pole and a first connection point, a second controllable semiconductor switch connected between the first connection point and a neutral direct current pole, a third controllable semiconductor switch connected between the neutral direct current pole and a second connection point, a fourth controllable semiconductor switch connected between the second connection point and a negative direct current pole, resistance means connected between the first connection point and the second connection point, and control means configured to control the second controllable semiconductor switch and the third controllable semiconductor switch into a conducting state in response to detecting a fault in the resistance means.

17 Claims, 2 Drawing Sheets

THREE-LEVEL BRAKE CHOPPER AND METHOD FOR CONTROLLING THREE-LEVEL BRAKE CHOPPER

TECHNICAL FIELD

The invention relates to a three-level brake chopper and to a method for controlling a three-level brake chopper.

BACKGROUND

A brake chopper, or braking chopper, may be used in connection with electric systems and devices, such as power converter devices, for dissipating regenerated energy that cannot be fed back to the supplying network, for instance. As an example, in case a motor controlled by a frequency converter having a DC (direct current) voltage intermediate circuit is rotated by a load connected to the motor, the motor can act as a generator and feed power back to the frequency converter. If a rectifier of the frequency converter is not configured or able to feed the regenerated energy back to a network supplying the frequency converter, the voltage of the intermediate circuit starts to increase. When the voltage of the intermediate circuit has increased to a predetermined limit, e.g. higher than a nominal voltage of the intermediate circuit, the brake chopper connected to the frequency converter may be activated and used to convert excess electrical energy into heat in a brake resistance thereof in order to reduce the voltage of the intermediate circuit. The brake chopper may be used to reduce the voltage until it is within acceptable limits from the nominal voltage, for example.

Three-level devices, such as three-level converter devices, are devices that have three DC poles. In addition to positive and negative DC poles, they have a neutral DC pole. A brake chopper for use in connection with such a three-level converter or other device may be provided as a three-level brake chopper also having respective positive and negative DC poles, and a neutral DC pole.

A protection against a fault in the brake resistance of the three-level brake chopper, such as a brake resistor earth-fault or short circuit, may be based on fuses, for example.

A problem related to the above solution is that fuses are bulky and expensive thus causing additional costs and requiring more space. Moreover, fuses may generate further losses in the system.

SUMMARY

An object of the present invention is thus to provide a method and an apparatus for implementing the method so as to overcome the above problems or at least to alleviate them. The objects of the invention are achieved by a method and a three-level brake chopper which are characterized by what is stated in the independent claims. The preferred embodiments of the invention are disclosed in the dependent claims.

The invention is based on the idea of connecting terminals of brake resistance to the neutral point in response to detecting a fault in the brake resistance by means of controllable semiconductor switches of the brake chopper.

An advantage of the solution of the invention is that a protection against a fault in the brake resistance of the three-level brake chopper can be arranged without fuses or similar extra components and thus potentially at reduced costs. Moreover, a protection reaction time to a fault can be improved.

BRIEF DESCRIPTION OF THE DRAWINGS

In the following the invention will be described in greater detail by means of exemplary embodiments with reference to the accompanying drawings, in which.

DETAILED DESCRIPTION

The following embodiments are exemplary. Although the description may refer to "an", "one", or "some" embodiment(s) in several locations, this does not necessarily mean that each such reference is to the same embodiment(s), or that the feature only applies to a single embodiment, for example. Single features of different embodiments may also be combined to provide other embodiments. Generally, all terms and expressions used should be interpreted broadly and they are intended to illustrate, not to restrict, the embodiments. The figures only show components necessary for understanding the various embodiments. The number and/or configuration of the various elements, and generally their implementation, could vary from the examples shown in the figures. The application of the various embodiments described herein is not limited to any specific system, but it can be used in connection with various electrical equipment such as power converter devices. In addition, the use of the various embodiments described herein is not restricted to any system utilizing a specific basic frequency or to any specific voltage level, for example.

Figure 1:
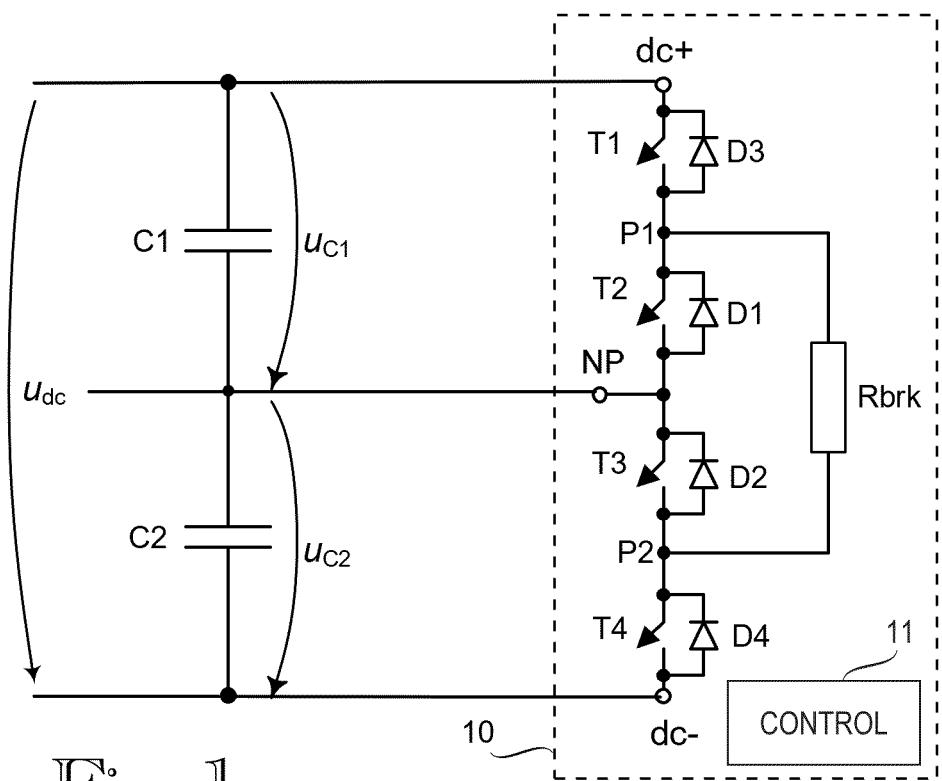
FIG. 1 illustrates an example of a three-level brake chopper according to an embodiment.
Figure 2:
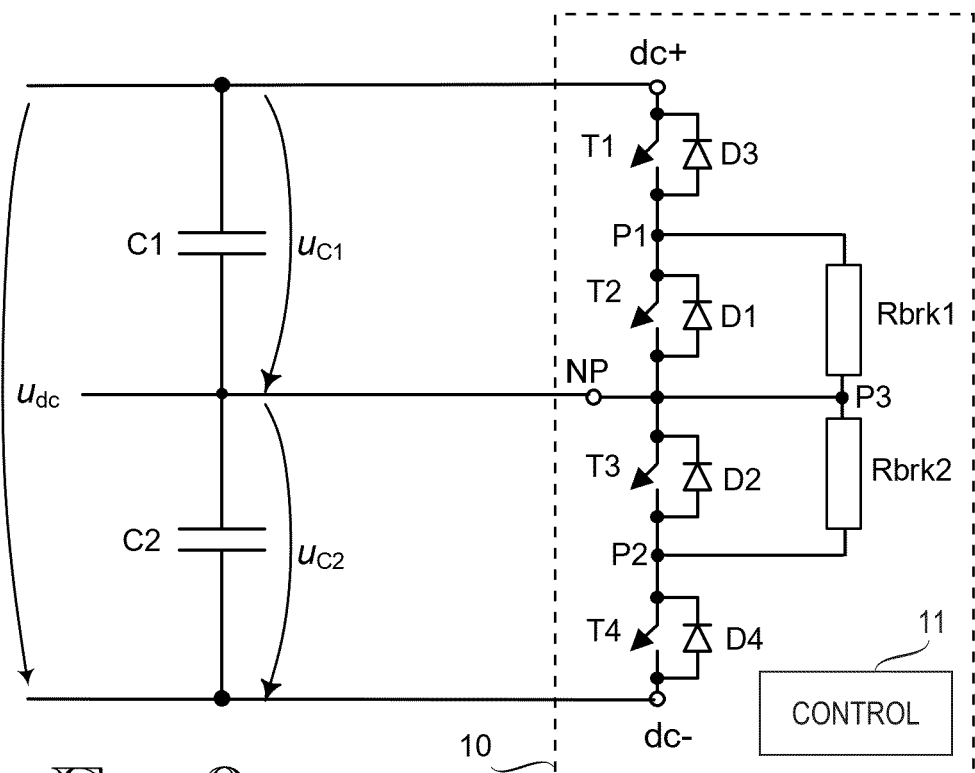
FIG. 2 illustrates an example of a three-level brake chopper according to an embodiment.

According to an embodiment and as exemplified in FIGS. 1 and 2, a three-level brake chopper 10 comprises a positive direct current pole dc+, a negative direct current pole dc− and a neutral direct current pole NP. The three-level brake chopper 10 further comprises a first controllable semiconductor switch T1 connected between the positive direct current pole dc+ and a first connection point P1 and a second controllable semiconductor switch T2 connected between the first connection point P1 and the neutral direct current pole NP. The three-level brake chopper 10 further comprises a third controllable semiconductor switch T3 connected between the neutral direct current pole NP and a second connection point P2 and a fourth controllable semiconductor switch T4 connected between the second connection point P2 and the negative direct current pole dc−. In the examples of FIGS. 1 and 2, collector/drain terminals of the controllable semiconductor switches T1, T2, T3, T4 are directed towards the positive direct current pole dc+ and emitter/source terminals of the controllable semiconductor switches T1, T2, T3, T4 are directed towards the negative direct current pole dc−. The controllable semiconductor switches T1, T2, T3, T4 can be IGBTs (Insulated Gate Bipolar Transistors) or FETs (Field-Effect Transistors), for example, or any suitable controllable semiconductor switches. The three-level brake chopper 10 further comprises resistance means Rbrk; Rbrk1, Rbrk2 connected between the first connection point and the second connection point. The resistance means Rbrk; Rbrk1, Rbrk2 may comprise one resistor or two or more resistors connected in series and/or in parallel with each other. According to an embodiment and as exemplified in FIG. 1, the resistance means Rbrk may be connected only to the first connection point P1 and the second connection point P2 in the brake chopper 10 main circuit. According to another embodiment and as exemplified in FIG. 2, the resistance means comprises two portions Rbrk1, Rbrk2 connected in series between the first connection point P1 and the second connection point P2 such that a connection point P3 between the two portions Rbrk1, Rbrk2 is connected to the neutral direct current pole NP. Each of the portions Rbrk1 and Rbrk2 may one resistor or two or more resistors connected in series and/or in parallel with each other. According to an embodiment, the three-level brake chopper 10 may further comprise a first diode D1 connected in parallel with the second controllable semiconductor switch T2 and a second diode D2 connected in parallel with the third controllable semiconductor switch T3. The first diode D1 and the second diode D2 enable e.g. energy possibly stored in stray inductances of cabling or wiring of the resistance means to be discharged. According to an embodiment, the three-level brake chopper 10 may further comprise a third diode D3 connected in parallel with the first controllable semiconductor switch T1 and a fourth diode D4 connected in parallel with the fourth controllable semiconductor switch T4. In the examples of FIGS. 1 and 2, cathode terminals of the possible diodes D1, D2, D3, D4 are directed towards the positive direct current pole dc+ and anode terminals of the possible diodes D1, D2, D3, D4 are directed towards the negative direct current pole dc−.

The exemplary brake chopper 10 of FIGS. 1 and 2 further comprises a control arrangement 11, which is configured to control the operation of the brake chopper 10, for example. For the sake of clarity, no internal control connections between the control arrangement 11 and other components of the brake chopper 10, such as the controllable semiconductor switches T1 to T4, are shown in the figures. The control arrangement 11 and its functionality may also be at least partly implemented by means of a control arrangement of another device, such as a power converter device, which the brake chopper 10 may be connected to or included in, for instance.

Figure 3:
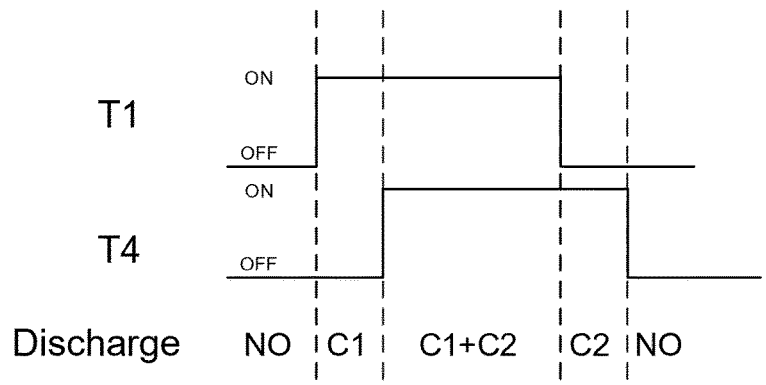
FIG. 3 illustrates an example of an operation of a three-level brake chopper according to an embodiment.

According to an embodiment, a three-level brake chopper 10 can be used and configured to discharge electrical energy from a capacitive circuit comprising capacitances C1 and C2, which may be a capacitive circuit of or relating to an electric power converter, such as an intermediate circuit thereof. Thus, capacitances C1 and C2 in FIGS. 1 and 2 may generally represent a three level DC voltage capacitive circuit where capacitances C1 and C2 are connected between a positive direct current pole, a negative direct current pole and a neutral direct current pole of such a capacitive circuit. The full DC voltage of the exemplary capacitive circuit is $u_{dc}$ and it is comprised of partial voltages $u_{C1}$ and $u_{C2}$ over capacitances C1 and C2, respectively. FIG. 3 illustrates an example of an operation of a three-level brake chopper according to an embodiment. According to an embodiment and as illustrated in FIG. 3, the three-level brake chopper 10 can be used to discharge electrical energy from only one half, C1 or C2, of the DC voltage capacitive circuit at a time, or from both halves, C1+C2, at the same time. For example, by controlling only the first controllable semiconductor switch T1 to be conductive, i.e. ON, a current runs from the positive direct current pole dc+ to the neutral direct current pole NP through the first controllable semiconductor switch T1, the brake resistance Rbrk, and the second diode D2. Thus, energy from the first half C1 of the DC voltage capacitive circuit is discharged. On the other hand, by controlling only the fourth controllable semiconductor switch T4 to be conductive, i.e. ON, a current runs from the neutral direct current pole NP to the negative direct current pole dc− through the first diode D1, the brake resistance Rbrk, and the fourth controllable semiconductor switch T4. Thus, energy from the second half C2 of the DC voltage capacitive circuit is discharged. The first diode D1 and the second diode D2 thus enable a non-simultaneous discharging of energy from the first half C1 and the second half C2 of the DC voltage capacitive circuit. Further, by controlling both the first controllable semiconductor switch T1 and the fourth controllable semiconductor switch T4 to be conductive, i.e. ON, a current runs from the positive direct current pole dc+ to the negative direct current pole dc− through the first controllable semiconductor switch T1, the brake resistance Rbrk, and the fourth controllable semiconductor switch T4. Thus, energy is discharged from the whole DC voltage capacitive circuit C1+C2.

According to an embodiment, in response to detecting a fault in the resistance means Rbrk; Rbrk1, Rbrk2, the second controllable semiconductor switch T2 and the third controllable semiconductor switch T3 are controlled into a conducting state, i.e. ON. As a result, the terminals of the resistance means Rbrk; Rbrk1, Rbrk2 are connected to the neutral point NP and thus essentially no voltage is applied across the resistance means. According to an embodiment, in response to detecting the fault in the resistance means, the first controllable semiconductor switch T1 and the fourth controllable semiconductor switch T4 are additionally controlled into a non-conducting state, i.e. OFF. If the first controllable semiconductor switch T1 and/or the fourth controllable semiconductor switch T4 are already in the non-conducting state, then they may be controlled to stay in the non-conducting state. According to an embodiment, the controlling of the first controllable semiconductor switch T1 and the fourth controllable semiconductor switch T4 into the non-conducting state may be performed before the controlling of the second controllable semiconductor switch T2 and the third controllable semiconductor switch T3 into the conducting state. Consequently, the second controllable semiconductor switch T2 and the third controllable semiconductor switch T3 may be controlled into the conducting state only after a predetermined delay, e.g. some microseconds later, from the controlling of the first controllable semiconductor switch T1 and the fourth controllable semiconductor switch T4 into the non-conducting state. E.g. in case of an earth-fault in the resistance means, the solution according to above embodiments effectively grounds the neutral point NP, and in case of a short circuit fault in the resistance means, it effectively stops current from flowing through the resistance means.

According to an embodiment, the fault in the resistance means may be any kind of fault, such as a brake resistor earth-fault and/or short circuit, for example. According to an embodiment, the detecting of the fault in the resistance means Rbrk; Rbrk1, Rbrk2 may be performed on the basis of one or more current and/or voltage quantities related to the three-level brake chopper 10 and/or on the basis of one or more signals received, for example. For this purpose, the control arrangement 11 may be configured to monitor one or more current and/or voltage quantities related to the three-level brake chopper 10, for instance. As an example, the detection of the fault in the resistance means Rbrk; Rbrk1, Rbrk2 may be based on the brake chopper 10 and/or resistance means Rbrk; Rbrk1, Rbrk2 current(s) information preferably combined with control signal information of one or more of the controllable semiconductor switches T1-T4. As another example, the detection of the fault in the resistance means Rbrk; Rbrk1, Rbrk2 may be based on collector-emitter (or drain-source) voltage(s) information of one or more of the controllable semiconductor switches T1-T4 preferably combined with control signal information of one or more of the controllable semiconductor switches T1-T4. As yet another example, the detection of the fault in the resistance means Rbrk; Rbrk1, Rbrk2 may be based on monitoring an output voltage of the three-level brake chopper 10 preferably combined with monitoring control signal information of one or more of the controllable semiconductor switches T1-T4. As yet another example, the detection of the fault in the resistance means Rbrk; Rbrk1, Rbrk2 may be based on monitoring the DC voltage $u_{dc}$ of the capacitive circuit, or its partial voltages $u_{C1}$ and $u_{C2}$, preferably combined with monitoring control signal information of one or more of the controllable semiconductor switches T1-T4. Also one or more separate or external sensors, such as a temperature sensor or an optical sensor, may be used for the detection of the fault in the resistance means Rbrk; Rbrk1, Rbrk2. Such a sensor(s) may then provide a signal indicative of the fault to the control arrangement 11, for example. Also any combination of the above alternatives for the fault detection could be utilized as well. According to an embodiment, the solution according to the above embodiments can also be combined with fuse or other type of protection if required for some reason, for instance.

Figure 4:
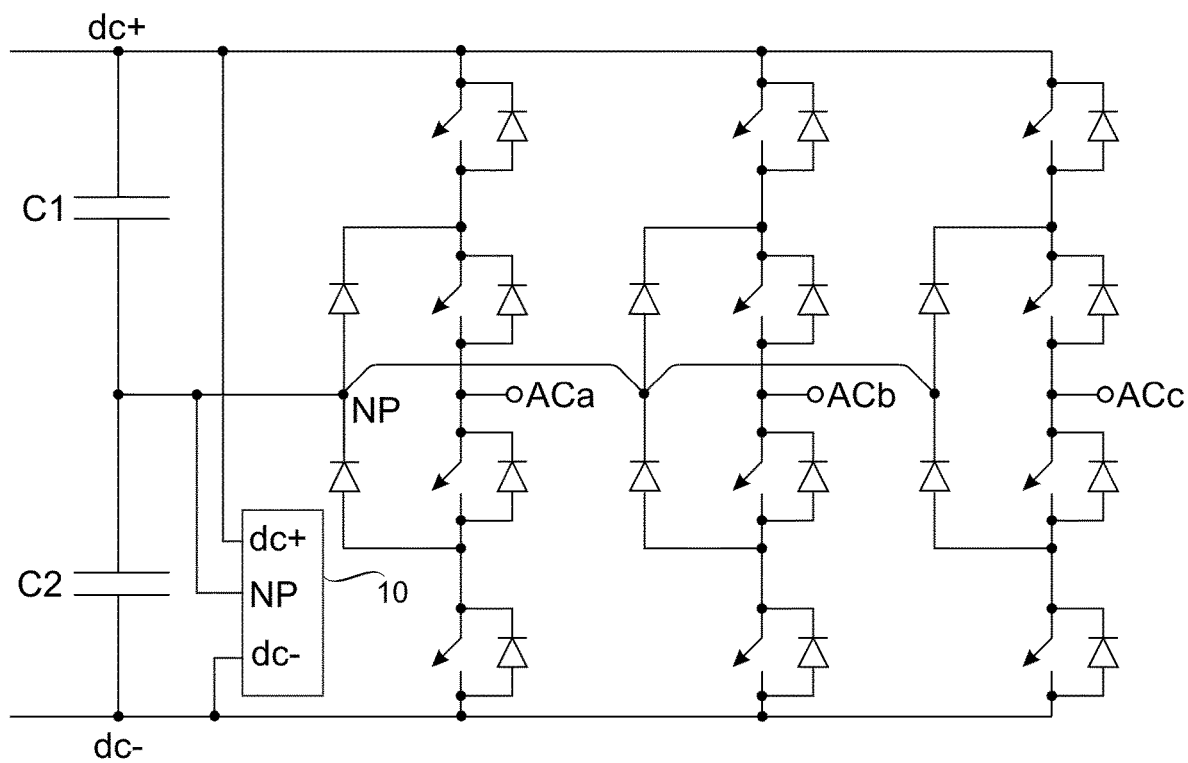
FIG. 4 illustrates an example of a three-phase three-level converter according to an embodiment.

According to an embodiment, a three-level converter device, such as an NPC (Neutral-Point-Clamped) converter or an ANPC (Active Neutral-Point-Clamped) converter, may comprise a three-level brake chopper 10 according to any one of the embodiments described herein. The three-level brake chopper 10 can be connected to the main circuit of the three-level converter by connecting the positive direct current poles dc+ of the three-level brake chopper and the three-level converter together, the negative direct current poles dc− of the three-level brake chopper and the three-level converter together, and the neutral direct current poles NP of the three-level brake chopper and the three-level converter together. FIG. 4 shows an example of a three-phase three-level NPC converter main circuit provided with a three-level brake chopper 10. The three alternating current poles of the converter are denoted as ACa, ACb, and ACc. The exemplary converter may operate as an inverter and/or as a rectifier, for example.

The control arrangement 11 or other means controlling operation of the brake chopper 10, according to any one of the embodiments described herein, or a combination thereof, may be implemented as one physical unit or as two or more separate physical units that are configured to implement the functionality of the various embodiments. Herein the term 'unit' generally refers to a physical or logical entity, such as a physical device or a part thereof or a software routine. The control arrangement 11 according to any one of the embodiments may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor. The CPU may comprise a set of registers, an arithmetic logic unit, and a control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the various embodiments, or a part thereof, may further comprise suitable input means for receiving e.g. measurement and/or control data, and output means for outputting e.g. control or other data. It is also possible to use a specific integrated circuit or circuits, or discrete electric components and devices for implementing at least part of the functionality according to any one of the embodiments.

Present power converter systems and components thereof, for example, may comprise processors and memory that may be utilized in implementing the functionality according to the various embodiments described herein. Thus, at least some modifications and configurations possibly required for implementing an embodiment could be performed as software routines, which may be implemented as added or updated software routines. If at least part of the functionality of any of the embodiments is implemented by software, such software may be provided as a computer program product comprising computer program code which, when run on a computer, causes the computer or corresponding arrangement to perform the functionality according to the embodiments as described herein. Such a computer program code may be stored or generally embodied on a computer readable medium, such as suitable memory, e.g. a flash memory or an optical memory, from which it is loadable to the unit or units executing the program code. In addition, such a computer program code implementing any of the embodiments may be loaded to the unit or units executing the computer program code via a suitable data network, for example, and it may replace or update a possibly existing program code.

It will be obvious to a person skilled in the art that, as the technology advances, the inventive concept can be implemented in various ways. The invention and its embodiments are not limited to the examples described above but may vary within the scope of the claims.

The invention claimed is:

1. A method for controlling a three-level brake chopper comprising:
   a positive direct current pole, a negative direct current pole, and a neutral direct current pole;
   a first controllable semiconductor switch connected between the positive direct current pole and a first connection point;
   a second controllable semiconductor switch connected between the first connection point and the neutral direct current pole;
   a third controllable semiconductor switch connected between the neutral direct current pole and a second connection point;
   a fourth controllable semiconductor switch connected between the second connection point and the negative direct current pole; and
   resistance means connected between the first connection point and the second connection point,
   the method comprising:
   in response to detecting a fault in the resistance means, controlling the second controllable semiconductor switch and the third controllable semiconductor switch into a conducting state.

2. The method of claim 1, further comprising:
in response to detecting the fault in the resistance means, controlling the first controllable semiconductor switch and the fourth controllable semiconductor switch into a non-conducting state.

3. The method of claim 2, wherein the controlling of the first controllable semiconductor switch and the fourth controllable semiconductor switch into the non-conducting state is performed before the controlling of the second controllable semiconductor switch and the third controllable semiconductor switch into the conducting state.

4. The method of claim 1, further comprising detecting the fault in the resistance means on the basis of one or more current and/or voltage quantities related to the three-level brake chopper and/or on the basis of one or more signals received.

5. A three-level brake chopper comprising:
a positive direct current pole, a negative direct current pole, and a neutral direct current pole;
a first controllable semiconductor switch connected between the positive direct current pole and a first connection point;
a second controllable semiconductor switch connected between the first connection point and the neutral direct current pole;
a third controllable semiconductor switch connected between the neutral direct current pole and a second connection point;
a fourth controllable semiconductor switch connected between the second connection point and the negative direct current pole;
resistance means connected between the first connection point and the second connection point; and
a control arrangement configured to control the second controllable semiconductor switch and the third controllable semiconductor switch into a conducting state in response to detecting a fault in the resistance means.

6. The three-level brake chopper of claim 5, wherein the control arrangement is configured to control the first controllable semiconductor switch and the fourth controllable semiconductor switch into a non-conducting state in response to detecting the fault in the resistance means.

7. The three-level brake chopper of claim 6, wherein the control arrangement is configured to perform the controlling of the first controllable semiconductor switch and the fourth controllable semiconductor switch into the non-conducting state is performed before the controlling of the second controllable semiconductor switch and the third controllable semiconductor switch into the conducting state.

8. The three-level brake chopper of claim 5, wherein the control arrangement is configured to detect the fault in the resistance means on the basis of one or more current and/or voltage quantities related to the three-level brake chopper and/or on the basis of one or more signals received.

9. The three-level brake chopper of claim 8, wherein the control arrangement is configured to monitor one or more current and/or voltage quantities related to the three-level brake chopper.

10. The three-level brake chopper of claim 5, wherein the resistance means comprise at least one resistor.

11. The three-level brake chopper of claim 10, wherein the resistance means comprise two or more resistors connected in series and/or in parallel with each other.

12. The three-level brake chopper of claim 10, wherein the resistance means comprise two portions connected in series between the first connection point and the second connection point, wherein a connection point between the two portions is connected to the neutral direct current pole.

13. The three-level brake chopper of claim 5, comprising a first diode connected in parallel with the second controllable semiconductor switch and a second diode connected in parallel with the third controllable semiconductor switch.

14. The three-level brake chopper of claim 13, comprising a third diode connected in parallel with the first controllable semiconductor switch and a fourth diode connected in parallel with the fourth controllable semiconductor switch.

15. The three-level brake chopper of claim 5, wherein the controllable semiconductor switches are insulated-gate bipolar transistors or field-effect transistors.

16. A three-level converter device, comprising a three-level brake chopper comprising:
a positive direct current pole, a negative direct current pole, and a neutral direct current pole;
a first controllable semiconductor switch connected between the positive direct current pole and a first connection point;
a second controllable semiconductor switch connected between the first connection point and the neutral direct current pole;
a third controllable semiconductor switch connected between the neutral direct current pole and a second connection point;
a fourth controllable semiconductor switch connected between the second connection point and the negative direct current pole;
at least one resistor connected between the first connection point and the second connection point; and
a control arrangement configured to control the second controllable semiconductor switch and the third controllable semiconductor switch into a conducting state in response to detecting a fault in the at least one resistor.

17. A three-level brake chopper apparatus comprising:
a positive direct current pole, a negative direct current pole, and a neutral direct current pole;
a first controllable semiconductor switch connected between the positive direct current pole and a first connection point;
a second controllable semiconductor switch connected between the first connection point and the neutral direct current pole;
a third controllable semiconductor switch connected between the neutral direct current pole and a second connection point;
a fourth controllable semiconductor switch connected between the second connection point and the negative direct current pole;
at least one brake resistor connected between the first connection point and the second connection point; and
a control arrangement comprising a processor, and a memory storing instructions that, when executed by the processor, cause the control arrangement to control the second controllable semiconductor switch and the third controllable semiconductor switch into a conducting state in response to detecting a fault in the at least one brake resistor.

* * * * *